United States Patent [19]
Corghi

[11] Patent Number: 5,381,843
[45] Date of Patent: Jan. 17, 1995

[54] BEAD RELEASE DEVICE FOR TIRE REMOVAL MACHINES

[75] Inventor: Remo Corghi, Correggio, Italy

[73] Assignee: Corghi - S.P.A., Correggio, Italy

[21] Appl. No.: 21,870

[22] Filed: Feb. 24, 1993

[30] Foreign Application Priority Data

Feb. 22, 1992 [IT] Italy .............. RE92 A 000008

[51] Int. Cl.[6] .............................................. B60C 25/00
[52] U.S. Cl. .................................... 157/1.28; 157/1.24
[58] Field of Search ................ 157/1.28, 1.17, 1.26, 157/1.2, 1.21, 1.22, 1.24

[56] References Cited

U.S. PATENT DOCUMENTS

| | | |
|---|---|---|
| 1,646,511 | 10/1927 | Weaver et al. |
| 2,523,448 | 9/1950 | Reitz |
| 4,884,611 | 12/1989 | Schmidt |
| 5,050,659 | 9/1991 | Scalambra ............ 157/1.24 |
| 5,088,539 | 2/1992 | Mannen et al. ......... 157/1.24 X |
| 5,215,138 | 6/1993 | Toriselli et al. ....... 157/1.26 X |
| 5,226,465 | 7/1993 | Schön et al. ............ 157/1.28 |

FOREIGN PATENT DOCUMENTS 0448042 9/1991 European Pat. Off.
9101930 7/1991 Germany.

OTHER PUBLICATIONS

Patent Abstracts of Japan, vol. 7, No. 24 (M-189) (1169) 29 Jan. 1983 & JP-A-57 178 907.

Primary Examiner—D. S. Meislin

[57] ABSTRACT

A bead release device for tire removal machines comprises an arm (60) which at one end is intended to be hinged on a vertical axis (6) to the base (1) of a tire removal machine (100), while at its other end it supports a positionable bead release tool (66), the arm being coupled with unilateral engagement to the rod (9) of a pneumatic cylinder-piston unit which is associated with the base, the unilateral engagement being achieved by a plurality of aligned equidistant identical notches (111) provided in the end longitudinal portion of the rod and by a coupling member (18) which is provided on the arm (60) and is arranged to occupy a rest position in which it allows the arm (60) and the rod (9) to slide freely relative to each other, and a working position in which it maintains the arm and rod coupled together.

5 Claims, 4 Drawing Sheets

BEAD RELEASE DEVICE FOR TIRE REMOVAL MACHINES

This invention relates to a bead release device for tire removal machines in general.

BACKGROUND OF THE INVENTION

For removing and mounting tires from and onto their respective wheel rims it is known to use suitable removal machines which will not be described in detail herein.

To remove the tire the tire beads have to be previously separated from the respective bead-holding edges of the wheel rim.

Modern tire removal machines are provided with a bead release device for effecting this separation.

Bead release devices are known comprising an arm positioned to the side of the base of the respective tire removal machine and hinged to said base on a rear vertical axis.

Said arm is provided at its front with a bead release tool, commonly known as a blade, with which there is associated a locator positioned to the side of said base and arranged to act as a support for the wheel rim during the tire bead release.

Finally, between said arm and base there is a pneumatic cylinder-piston unit which is coupled to the arm with unilateral engagement.

Specifically, said coupling is achieved by a vertical pin which is rotatably mounted on said arm and is provided with a diametrical hole into which the rod of said cylinder-piston unit is slidingly inserted, said rod being provided with a terminal head for drawing said arm towards said locator.

The procedure for effecting bead release with said known devices is as follows.

At the commencement of a bead release operation the rod of the cylinder-piston unit is completely extended and the arm has rotated into its rest position, in which it is spaced apart from said locator.

The wheel (rim plus tire) is then placed upright resting against said locator, and the arm is made to approach the locator, with the bead release tool brought into contact with the tire bead a short distance from the bead-holding edge of the wheel rim.

During this approach the cylinder-piston unit remains in the preceding configuration, with the arm sliding along the (extended) rod of the cylinder-piston unit, so withdrawing from the terminal head of the rod.

After this approach the cylinder-piston unit is made to contract, its rod then dragging the arm and hence the bead release tool towards the wheel only after the rod head has made up the distance which separates it from the hinge pin between the rod and arm.

Basically, the actual bead release action begins only after the rod has undergone a certain idle travel, this idle travel resulting in the following drawbacks.

Firstly, said idle travel results in relatively long bead release times, which increase as the width of the wheel to undergo bead release increases.

Secondly, this idle travel results in wastage of compressed air. It will be apparent that such problems increase considerably if in order to separate a tire bead the bead release tool has to be positioned in different circumferential regions of the bead, this being necessary if the bead is tightly attached to the respective bead-holding edge and/or to the corresponding ridge.

SUMMARY OF THE PRESENT INVENTION

The main object of the present invention is to obviate the aforesaid problems within the context of a simple and rational construction.

To attain said object the invention provides a plurality of aligned equidistant identical notches in the end portion of the rod of the cylinder-piston unit, and a coupling member which is associated with the arm carrying the bead release tool and is arranged to engage said notches.

Said plurality of notches preferably consists of a sawtooth rack, said coupling member consisting of a pawl of conjugate shape.

The coupling and release positions of said pawl are determined by suitable means, for example controlled by the operator, said coupling and release positions being preferably governed, according to an advantageous characteristic of the invention, by the contraction and elongation of the cylinder-piston unit.

All the objects of the invention are achieved by virtue of the aforesaid means, in that the idle travel of the rod of the cylinder-piston unit is eliminated whatever the width of the wheel to be subjected to bead release.

In this respect, when the arm has been rotated (manually) towards the base of the tire removal machine and the bead release tool has been rested against the tire bead, contracting the cylinder-piston unit results in instantaneous engagement between the pawl and the rack, with the result that the arm (and the bead release tool) is immediately pulled towards the tire removal machine (and towards the wheel to be subjected to bead release). The charcteristics and constructional merits of the invention will be apparent from the detailed description of a preferred embodiment thereof given hereinafter by way of non-limiting example with reference to the accompanying drawings.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENTS

Figure 1:
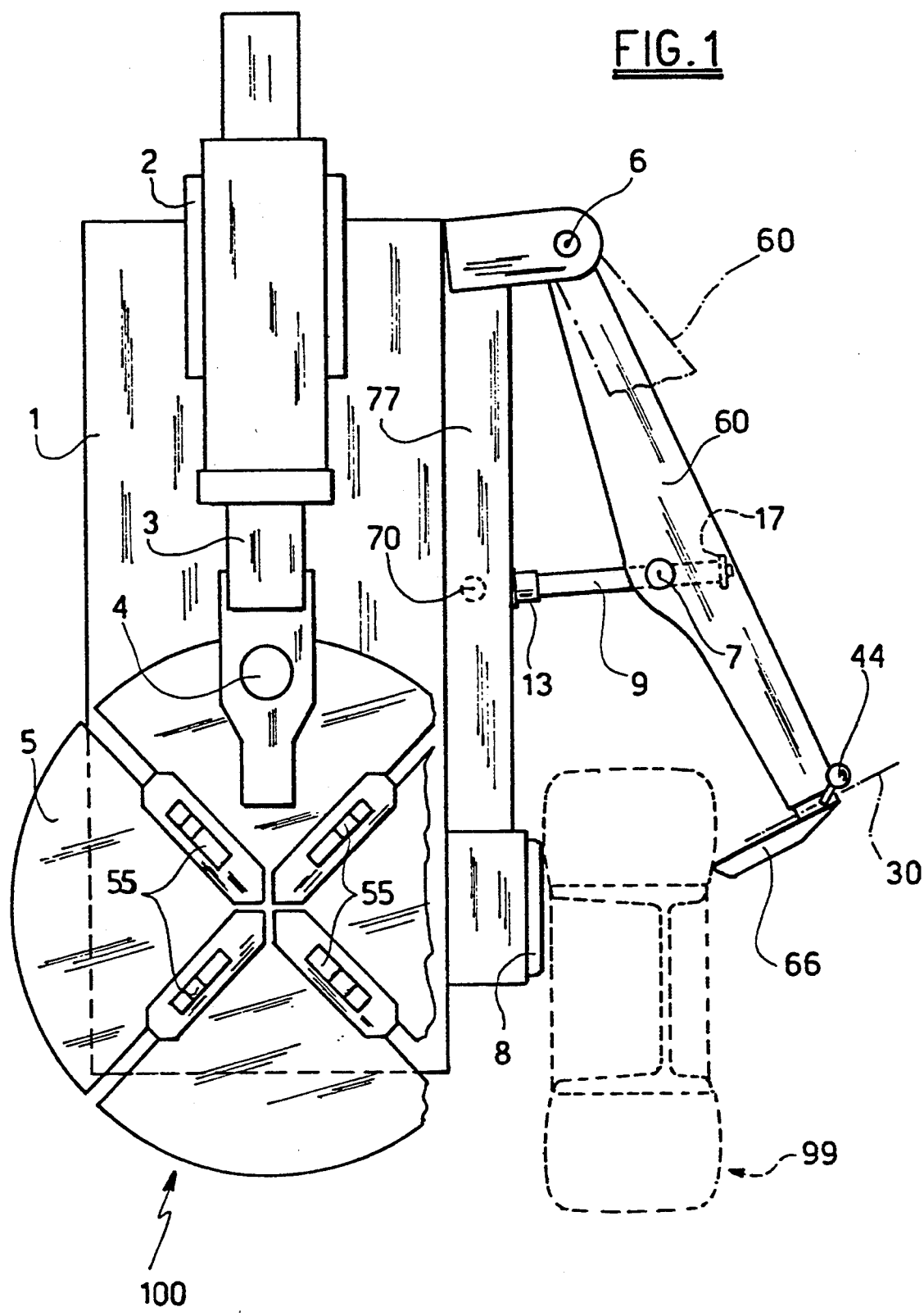
FIG. 1 is a top view of the invention associated with a tire removal machine and shown in the starting position for bead release of a relatively wide tire.
Figure 2:
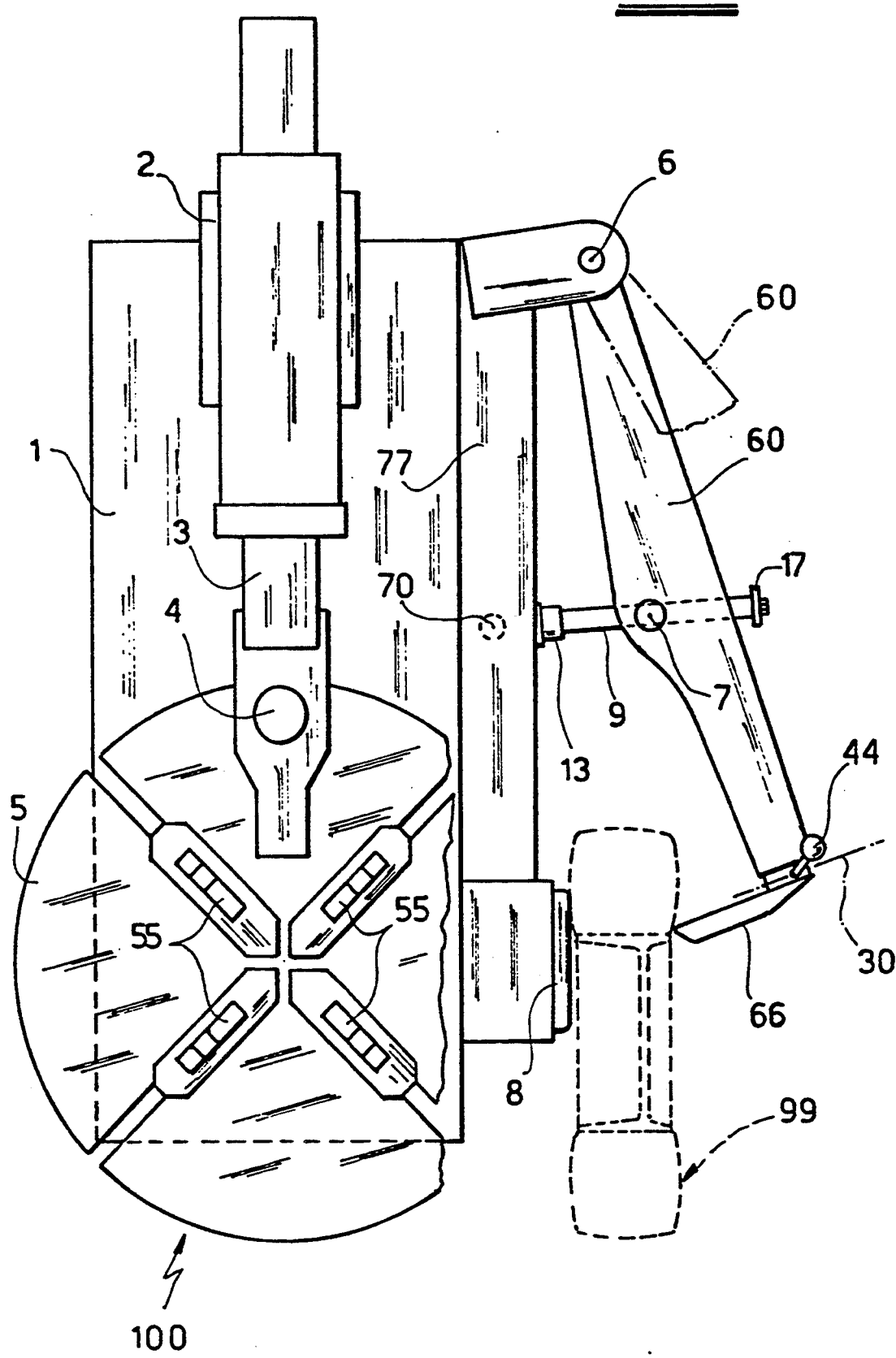
FIG. 2 is a view similar to the preceding, the invention being shown in the starting position for bead release of a relatively narrow tire.

Said figures, and in particular FIGS. 1 and 2, show a tire removal machine, indicated by 100, which comprises basically a frame or base 1 from which there upwardly extends a column 2, at the top end of which there is a longitudinally slidable horizontal bar 3. Said bar 3 supports a height-adjustable vertical rod 4 which is provided lowerly with a tool (not shown) for removing and mounting tyres from and onto their respective wheel rims. Said tool lies above a rotatable horizontal plate 5 which in the case under examination comprises four angularly equidistant heads 55 which slide radially for gripping the wheel rims.

As is usual, said heads 55 are of the double action type, ie they grip the rims both from the inside and from the outside.

As can be seen, on one side wall of the base 1, namely that to the right in FIGS. 1 and 2, there is provided a horizontally extending elongate box member 77, at the opposing ends of which there are provided a front locator 8 and a rear vertical pin 6.

Said locator 8 acts as a support for the rim of a wheel 99 (upright) from which the bead is to be released, an arm 60 being hinged on said pin 6.

A bead release tool 66, commonly known as a blade and provided with a projecting lever 44, is hinged on a horizontal transverse axis to the front end of the arm 60.

The body of a single-acting cylinder-piston unit (not shown because it is of usual type) housed within the base is hinged to said box member 77 on a vertical axis 70.

The rod 9 of said cylinder-piston unit extends towards the central region of the arm 60 where the means according to the invention are provided for the mutual coupling of said rod 9 and arm 60 during bead release.

Said means are described hereinafter with reference to FIGS. 3 and 4.

As can be seen, said rod 9 terminates with a threaded portion 10 on which a coaxial prismatic bar 11 is screwed.

With the inner end of said bar 11 there is associated a locking nut 12 which is screwed onto said threaded portion 10, between said nut 12 and the box member 77 there being provided a cover 13, mounted to the box member 77. The cover 13 is cylindrical in shape having an aperture through which the rod 9 is slidably received.

Figure 3:
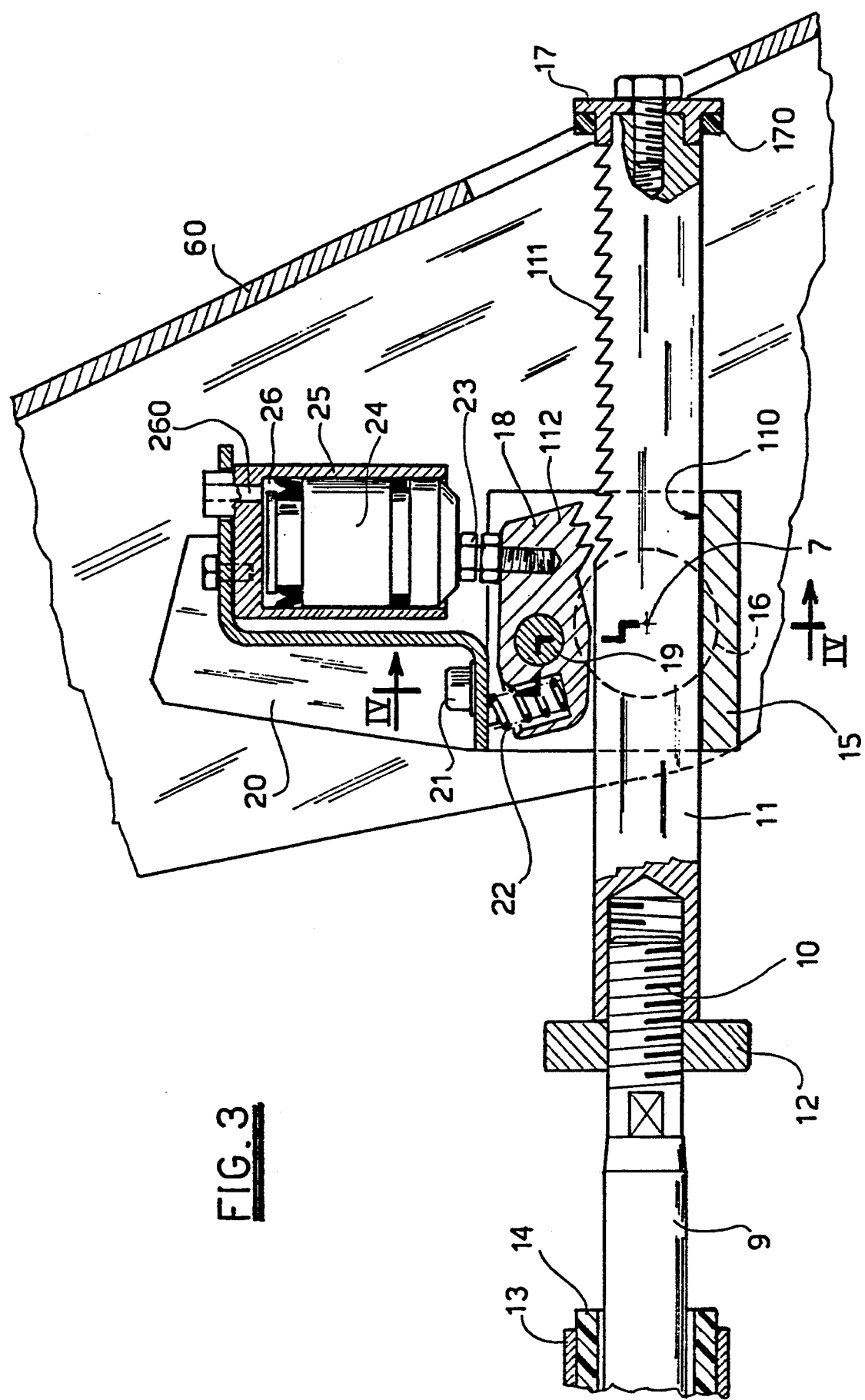
FIG. 3 is a sectional plan view to a greater scale showing the mutual coupling means interposed between the rotating arm and the respective operating rod.

Between said rod 9 and cover 13 there is interposed a sleeve 14 of elastic material such as rubber, the ends of which extend beyond those of the cover 13 (see FIG. 3). The purpose of said cover 13 is to mask the aperture (not shown) provided in the box member 77 for passage of the rod 9, the purpose of said sleeve 14 being to prevent noisy contact between the cover 13 and said nut 12 and box member 77.

The bar 11 is inserted, with an exact nut freely slidable fit, into a conjugate prismatic seat 110 provided in a block 15.

Said block 15 is housed within the arm 60, which is of channel cross-section with its mouth facing the base 1 (see FIG. 3).

The block 15 is hinged to the arm 60 on a vertical axis, which is indicated by 7 in all the accompanying figures and intersects the longitudinal axis of the bar 11. Specifically, said axis 7 is defined by two centrally holed coaxial discs 16 partly received in two conjugate recesses provided in the lower and upper faces of the block 15.

The projecting parts of said two discs 16 are received in respective holes 160 provided in the flanges of the arm 60, said discs 16 extending beyond the outer faces of said flanges.

Figure 4:
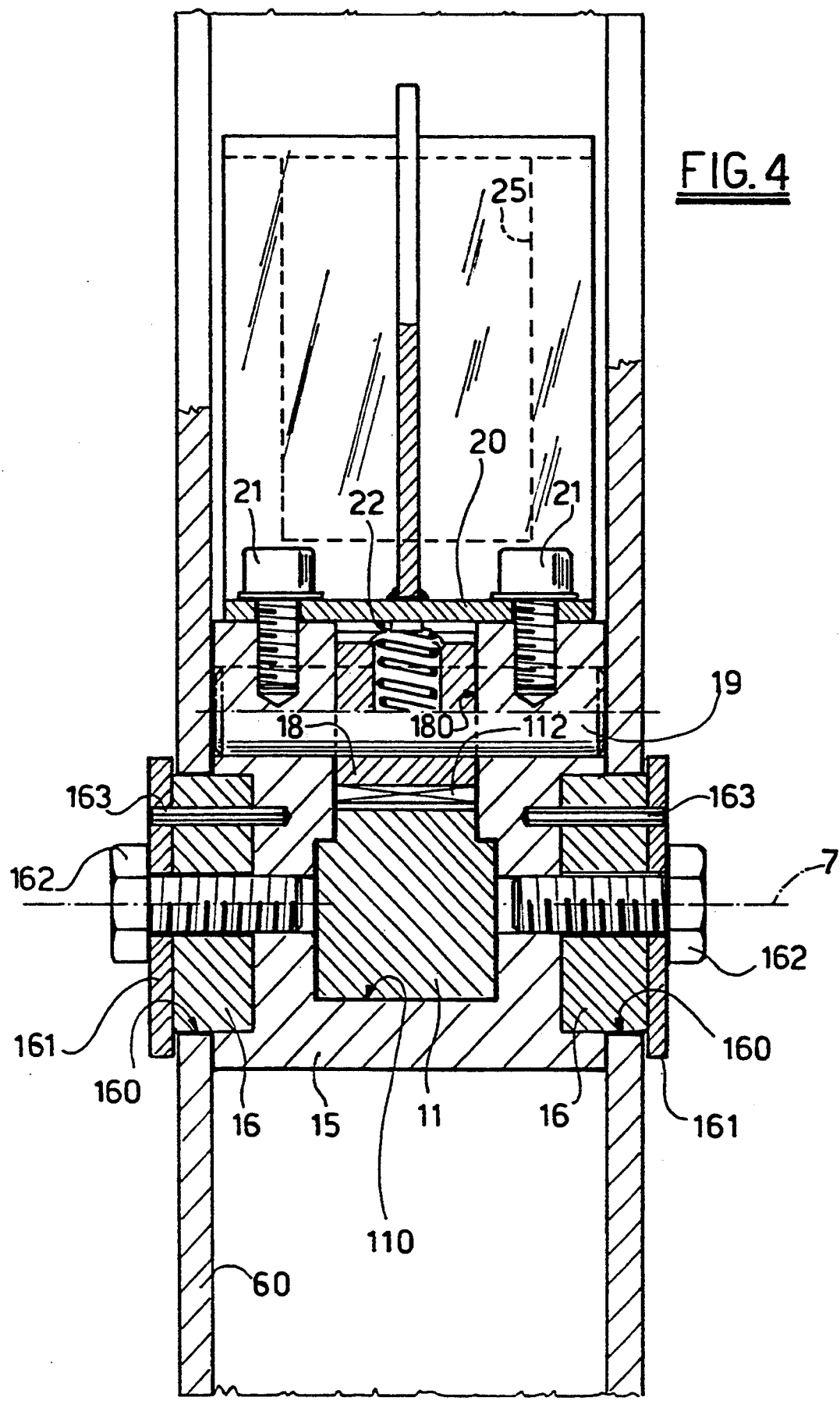
FIG. 4 is a section on the line IV—IV of FIG. 3 to a greater scale.

Respective greater-diameter washers 161 rest against the outer ends of said discs 16, these latter and the washers 161 being torsionally fixed to the block 15 by at least two split pins 163 (FIG. 4).

Finally, the discs 16 and the washers 161 are axially locked by two through screws 162 screwed into the block 15.

As can be seen in FIG. 3, the bar 11 extends beyond the block 15, where it comprises a cap 17 the purpose of which is to prevent the block 15 withdrawing from the bar 11. Said cap 17 is provided with a damper ring 170, for example of rubber, the purpose of which is to prevent noisy contact between said block 15 and cap 17 when the arm 60 is rotated into its position of maximum opening. This latter is shown schematically in FIGS. 1 and 2 by dashed and dotted lines.

With reference to FIG. 3 it can be seen that a rack portion 111 is provided on that side of the bar 11 facing the pin 6 on which the arm 60 is hinged.

Said rack 11 is of the saw-tooth type, the teeth being inclined towards the base 1. In front of said rack 111 there is a pawl 18 consisting of an elongate flat profiled body virtually parallel to the bar 11 (FIG. 3). Said pawl 18 is received, practically as an exact fit, in a seat 180 (see FIG. 4) forming a lateral extension of the seat 110 within which the bar 11 slides.

The pawl 18 is pivoted to the block 15 on a transverse axis 19 parallel to the axis 7, and lies between the bar 11 and an opposing profiled support 20 fixed to the block 15 by screws 21. On that side of the pawl 18 facing the bar 21 there are provided, at that end closer to the cap 17, three saw-teeth 112 having the same shape and dimensions as those of the toothing of the rack 111.

It should be noted that the pawl 18 and rack 111 are formed of very hard material by microfusion.

In the illustrated example, the rack 111 is formed in one piece with the bar 11, however said rack 111 can be formed separately and then fixed to the bar 11 or rod 9.

As can be seen in FIG. 3, a compression spring 22 and a push rod 23 are provided on the opposite face of the pawl 18 on one and the other side of its pivot 19.

Said spring 22 is partly received in a recess in said pawl 18, its outer end resting against the support 20. The purpose of the spring is to urge the pawl 18 into its release position.

Said push rod 23 rests against a piston 24 which is slidingly received in a sealed manner within a hollow cylinder 25 which is fixed to the support 20. The purpose of the piston 24 is to urge the pawl 18 into its coupled position against the spring 22, there being provided between said piston 24 and cylinder 25 for this purpose a service chamber 26 into which a duct 260 opens.

This latter is connected to a compressed air source via suitable valve means.

In particular, according to an advantageous characteristic of the invention, the duct 260 is connected to the valve unit associated with that pedal of the tire removal machine 100 which controls the elongation/contraction of the cylinder-piston unit which operates the arm 60.

The pawl 18 can be coupled and released by equivalent means. What is important is that this coupling and release of the pawl is done in association with the contraction and elongation of said cylinder-piston unit.

The invention operates as follows.

On commencing a bead release operation, the rod 9 is completely extended and the arm 60 is rotated into its position of maximum opening (shown by dashed and dotted lines in FIGS. 1 and 2).

At the same time the chamber 26 is connected to discharge, the spring 22 maintaining the pawl 18 in its released position.

The wheel 99 to undergo bead release, which can be wide or narrow as shown in FIGS. 1 and 2 respectively, is rested against the locator 8 and the arm 60 is rotated towards this latter so that the tool is in contact with the bead of said wheel 99.

At this point the rod 9 is made to retract, resulting in instantaneous coupling of the pawl 18 to the rack 111 by virtue of the advancement of the piston 24, and in simultaneous pulling of the arm 60 and hence of the bead release tool 66.

On termination of bead release the rod 9 is made to extend, resulting in instantaneous connection of the chamber 26 to discharge and the simultaneous release of the pawl 18 by the effect of the spring 22.

After this the described cycle is repeated identically for the next bead release operation.

The merits and advantages of the invention are apparent from the aforegoing and from an examination of the accompanying figures.

Lastly, it should be noted that when the pawl 18 is in its released position (FIG. 3) the respective teeth 112 are at a short distance from the toothing of the rack 111, and have their points lying in a plane which is slightly inclined to the plane in which the pointed ends of the rack 111 lie.

Specifically, said two planes define an acute angle with its opening facing the cap 17.

This arrangement virtually completely eliminates any jamming or mutual slippage between the two toothings 111 and 112, which are perfectly aligned and copenetrating when the pawl 18 is coupled.

It should also be noted that the length of the rack 111 is such as to prevent excessive and inconvenient approach of the tool 66 to the locator 8 when the pawl 18 engages that end of the rack 111 close to the locator 8. Beyond said end the corresponding face of the bar 11 is perfectly smooth to enable the teeth 112 to slide along the bar when the wheel 99 undergoing bead release is fairly narrow.

The invention is not limited to that illustrated and described, but comprises all technical equivalents to the stated means and their combination, if effected within the context of the following claims.

I claim:

1. A bead release device for tire removal machines, comprising:

an arm which at one end is hinged on a vertical axis to a base of a tire removal machine, while at another end said arm supports a positionable bead release tool, said arm being coupled with unilateral engagement to a rod of a pneumatic cylinder-piston unit which is associated with said base to urge said bead release tool against a rim-tire assembly, in which said unilateral engagement is achieved by a plurality of aligned equidistant identical notches including a saw-tooth rack provided on an end longitudinal portion of said rod and by a coupling member which is provided on said arm, said coupling member is biased by an elastic means to occupy a rest position in which it allows said arm and said rod to slide freely relative to each other, and said coupling member also includes an operating means for placing said coupling member in a working position in which said coupling member maintains said arm and said rod coupled together.

2. The device as in claim 1, wherein said coupling member comprises:

a pawl which is provided with at least one tooth conjugate with those of said longitudinal portion of said rack, and is pivoted to a guide and slide member for said rod.

3. The device as in claim 2, wherein said operating means are governed by commands which are provided for elongating and contracting said pneumatic cylinder-piston unit.

4. The device as in claim 3, wherein said operating means consist of a pneumatic unit comprising a piston and a cylinder, of which the piston rests against said pawl, and the cylinder is connected to means of the tire removal machine which are provided for feeding compressed air to said pneumatic cylinder-piston unit.

5. The device as in claim 2, wherein said rack and said pawl are formed of microfused material.

* * * * *

UNITED STATES PATENT AND TRADEMARK OFFICE
CERTIFICATE OF CORRECTION

PATENT NO. : 5,381,843
DATED : January 17, 1995
INVENTOR(S) : Remo GORGHI

It is certified that error appears in the above-indentified patent and that said Letters Patent is hereby corrected as shown below:

On the Title Page, under the Heading, [30] Foreign Application Priority Data, change "Feb. 22, 1992 [IT]   Italy .......... RE92 A 000008" to -- Feb. 28, 1992 [IT]   Italy ............ RE92 A 000008 --

Signed and Sealed this

Twenty-eight Day of March, 1995

Attest:

BRUCE LEHMAN

*Attesting Officer*     *Commissioner of Patents and Trademarks*